(12) United States Patent
Haraguchi et al.

(10) Patent No.: US 7,765,535 B2
(45) Date of Patent: Jul. 27, 2010

(54) SOFTWARE DEVELOPMENT TOOL PROGRAM

(75) Inventors: Masatoshi Haraguchi, Kawasaki (JP); Masaki Arai, Kawasaki (JP); Kotaro Taki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1073 days.

(21) Appl. No.: 11/409,810

(22) Filed: Apr. 24, 2006

(65) Prior Publication Data

US 2007/0006157 A1  Jan. 4, 2007

Related U.S. Application Data

(63) Continuation of application No. PCT/JP03/13557, filed on Oct. 23, 2003.

(51) Int. Cl.
*G06F 9/45* (2006.01)

(52) U.S. Cl. .................. 717/158; 717/151; 717/152; 717/153; 717/154; 717/155; 717/156; 717/157

(58) Field of Classification Search .......... 717/151–158
See application file for complete search history.

(56) References Cited

U.S. PATENT DOCUMENTS

| | | | | |
|---|---|---|---|---|
| 5,182,806 | A * | 1/1993 | McKeeman et al. | 717/145 |
| 5,442,790 | A * | 8/1995 | Nosenchuck | 717/155 |
| 5,966,536 | A * | 10/1999 | Ravichandran | 717/153 |
| 6,799,315 | B2 * | 9/2004 | Waki et al. | 717/148 |
| 6,922,829 | B2 * | 7/2005 | Ward et al. | 717/154 |
| 7,181,735 | B1 * | 2/2007 | Haraguchi et al. | 717/151 |
| 7,237,234 | B2 * | 6/2007 | Granston et al. | 717/151 |
| 2001/0032332 | A1 | 10/2001 | Ward et al. | |
| 2002/0196678 | A1 * | 12/2002 | Haber et al. | 365/200 |
| 2003/0171907 | A1 * | 9/2003 | Gal-On et al. | 717/158 |

FOREIGN PATENT DOCUMENTS

| | | | |
|---|---|---|---|
| JP | 06-214803 | | 8/1994 |
| JP | 08-087417 | | 4/1996 |
| JP | 08-087427 | | 4/1996 |
| JP | 2000-81984 | | 3/2000 |
| JP | 2000-353110 | | 12/2000 |
| JP | 2001-147820 | | 5/2001 |
| JP | 2001-243077 | * | 7/2001 |
| JP | 2001-243077 | | 9/2001 |
| JP | 2003-131889 | | 5/2003 |
| JP | 2003-131889 | * | 9/2003 |

OTHER PUBLICATIONS

"Optimization of compiled code in the programming environment", Cooper et al., Department of computer science Rice University.*
"Bugfind: A Tool for Debugging Optimizing Compilers", Caron et al., 1990, ACM Sigplan Notices, vol. 25, pp. 17-22.*

* cited by examiner

*Primary Examiner*—Wei Y Zhen
*Assistant Examiner*—Junchun Wu
(74) *Attorney, Agent, or Firm*—Greer, Burns & Crain, Ltd.

(57) ABSTRACT

In a computer where a software development tool program is started, an updating elapse degree and an execution frequency for a series of source programs used for generating an execution module are acquired. An optimization option of the level according to the updating elapse degree or the execution frequency is set for each of the source programs. Compiling accompanied by the optimization of the level indicated by the optimization option is performed for each of the source programs. Object programs created by the compiling are coupled.

12 Claims, 12 Drawing Sheets

Fig. 5

Post-update elapsed degree setting/input screen — 23

Elapsed time from update    compiler option

23a { Within [ 1 ] hours    [ -01 ] } 23b
     Within [ 24 ] hours    [ -02 ]
     Within [    ] hours    [     ]

Other than above    [ -03 ] — 23c

Execution frequency setting/input screen — 24

Ratio of execution cost to the total sum    Compiler option

24a { [ 20 ] % or more    [ -03 ] } 24b
     [ 10 ] % or more    [ -02 ]
     [    ] % or more    [     ]

Other than above    [ -01 ] — 24c

24d — [ O K ]

SOFTWARE DEVELOPMENT TOOL PROGRAM

This is a continuation of International Application No. PCT/JP03/13557, filed Oct. 23, 2003.

TECHNICAL FIELD

The present invention relates to a software development tool program that makes a computer function as a device for generating an executable format file based on source programs.

BACKGROUND ART

It is a known fact that a software development tool is used for generating an executable format program file (it is referred to as an "execution module" in the following description) based on source files that are written by a developer with using an editor. This software development tool is provided with a compiler that translates a source program into an object program, a linker that generates an execution module by linking object programs.

In general, a developer can designate options of a compilation execution command to execute an optimization option for deleting needless branches, to generate an execution module for debugging a source program or the like for a compiler. And then, any compiler options can be designated for the above-mentioned software development tool so that a developer does not have to designate compiler options at every time of generation of an execution module.

Incidentally, execution tests of an execution module and revisions of a source program are frequently repeated in the software development. Therefore, if the generation of the execution module from the revised source program takes much time, it increases development duration for the software. Because of this, developers require the technique to reduce a time to generate an execution module. In addition, prior arts concerned with such a software development tool are disclosed in the patent document 1 and the patent document 2, for example.

Patent Document 1
  Japanese unexamined patent publication Hei 06-214803

Patent Document 2
  Japanese unexamined patent publication Hei 08-087417

DISCLOSURE OF THE INVENTION

In the above-described software development tools, if compiler options set in a source program are optimized according to a condition of the source program at a compilation time, the time for generating an execution module is somewhat reduced with giving the execution module a minimum ability to accomplish an execution test. The condition of the source program means, specifically, an update condition of the source program, an importance of the source program within the whole, a possibility that a malfunction caused in the source program has a deleterious effect on another source program, or the like. However, such a software development tool that dynamically changes settings of compiler options according to a condition of a source program has not been in existence until now.

In addition, in such a software development tool, settings of compiler options can be manually changed each time an execution module is generated. However, in such a case, while a time for generating an execution module may be somewhat reduced, it is substantially impossible to change compiler options of each source program because many source programs are used to generate one execution module in general.

The present invention is achieved in view of the conventional circumstances described above, and its object is to provide a software development tool program that makes a computer function as a device that can dynamically change compiler options so as to keep a balance between a generating time of an execution module and an execution performance in an execution test even if a developer does not change settings of the compiler options frequently, and that enables a software development efficiently as a result.

A software development tool program according to a first aspect of the present invention that is constituted to solve the above-mentioned problem is a software development tool program to generate an execution module based on object programs that are obtained by compiling one or many source program, characterized in that, making a computer, which connects with an input device and a recording device in which a series of source programs used to generate an execution module are stored, accept an instruction to execute compilations of said series of source programs by said input device;

making the computer determine an evaluation period to which an elapsed time from an update time of each of said series of source programs in said recording device belongs among many evaluation periods having different sizes, when said input device accepts said instruction;

making the computer set an optimization option, for each of said series of source programs, whose level is appropriate to the evaluation period to which an elapsed time of a source program itself belongs;

making the computer compile each of said source programs with the optimization level shown by said optimization option that is independently set in each of said series of source programs; and making the computer record the respective object programs obtained by said compilations into said recording device.

With this constitution, when the instruction of an execution to compile the series of source programs is input to the input device, the optimization option with a low optimization level is set for a source program that is frequently revised and updated, conversely, the optimization option with a high optimization level is set for a source program that is not frequently updated. Since an optimization level of an optimization option set for a source program is raised or lowered in response to an update status of the source program, a frequently revised and updated source program is simply compiled with the optimization level that increases a generating speed of the execution module, conversely, a source program that is not frequently updated is precisely compiled with the optimization level that increases the execution performance of the execution module in the execution test. Accordingly, a developer can dynamically set compiler options to each source program so as to balance the generating time of the execution module and an execution performance in an execution test without changing the compiler options while checking conditions of source programs one by one. As a result, a developer can develop software efficiently.

Further, a software development tool program according to a second aspect of the present invention that is constituted to solve the above-mentioned problem is a software development tool program to generate an execution module based on object programs that are obtained by compiling one or many source program, characterized in that, making a computer, which connects with an input device and a recording device in which a series of source programs used to generate an execution module are stored, accept an instruction to execute compilations of said series of source programs by said input device;

making the computer determine whether each of said series of source programs in said recording device includes information about an execution number of each of blocks dividing the source program in a predetermined size as profile information or not, when said input device accepts said instruction;

making the computer calculate the total of the execution numbers of the respective blocks as an execution cost for each of said series of source programs only when said series of source programs include said profile information;

making the computer calculate a ratio of the execution cost of said source program to the total of the execution costs of said series of source programs as an execution frequency of each of said source programs;

making the computer determine an evaluation ratio range to which the calculated execution frequency of each of said source programs belongs among many evaluation ratio ranges having different sizes;

making the computer set an optimization option, for each of said series of source programs, whose level is appropriate to the evaluation ratio range to which an execution frequency of the source program itself belongs;

making the computer compile each of said source programs with the optimization level shown by said an optimization option that is independently set in each of said series of source programs; and making the computer record the respective object programs obtained by said compilations into said recording device.

With this construction, when the instruction of an execution to compile the series of source programs is input to the input device, the optimization option with a high optimization level is set for a source program whose execution number is large among the series of source programs, the optimization option with a low optimization level is set for a source program whose execution number is small among the series of source programs. Since an optimization level of an optimization option set for a source program is raised or lowered in response to an importance of a source program among the whole, a source program that has a high execution frequency and a high importance is precisely compiled with the optimization level that increases the execution performance of the execution module in the execution test, conversely, a source program that has a low execution frequency and a low importance is simply compiled with the optimization level that increases a generating speed of the execution module. Accordingly, a developer can dynamically set compiler options to each source program so as to balance the generating time of the execution module and an execution performance in an execution test without changing the compiler options while checking conditions of source programs one by one. As a result, a developer can develop software efficiently.

Further, a software development tool program according to a third aspect of the present invention that is constituted to solve the above-mentioned problem is a software development tool program to generate an execution module based on object programs that are obtained by compiling one or many source program, characterized in that, making a computer, which connects with an input device and a recording device in which a series of source programs used to generate an execution module are stored, accept an instruction to execute compilations of said series of source programs by said input device;

making the computer determine an evaluation period to which an elapsed time from an update time of each of said series of source programs in said recording device belongs among many evaluation periods having different sizes, when said input device accepts said instruction;

making the computer determine whether said series of source programs include information about an execution number of each of blocks dividing the source program in a predetermined size as profile information or not;

making the computer determine whether said series of source programs include information about an execution number of each of blocks dividing the source program in a predetermined size as profile information or not;

making the computer calculate the total of the execution numbers of the respective blocks as an execution cost for each of said series of source programs only when said series of source programs include said profile information;

making the computer calculate a ratio of the execution cost of each of said source programs to the total of the execution costs of said series of source programs as an execution frequency of each of said source programs;

making the computer determine an evaluation ratio range to which the calculated execution frequency of each of said source programs belongs among many evaluation ratio ranges having different sizes;

making the computer set an optimization option, for the source program whose execution frequency belongs to the maximum evaluation ratio range among the evaluation ratio ranges, whose level is appropriate to its evaluation ratio range, and set an optimization option, for the source program whose execution frequency does not belong to the maximum evaluation ratio range, whose level is appropriate to the evaluation period to which the elapsed time of the source program belongs;

making the computer compile each of said source programs with the optimization level shown by said optimization option that is independently set in each of said series of source programs; and making the computer record the respective object programs obtained by said compilations into said recording device.

With this construction, when the instruction of an execution to compile the series of source programs is input to the input device, the optimization option with a high optimization level is set for a source program whose importance is in the maximum level among the series of source programs, the optimization option with an optimization level appropriate to an update status is set for a source program whose importance is not in the maximum level among the series of source programs. Since an optimization level of an optimization option set for a source program is raised or lowered in response to an importance and an update status of a source program, a source program whose importance is in the maximum level is precisely compiled with the optimization level that increases the execution performance of the execution module in the execution test, a source program whose importance is not in the maximum level is simply compiled with the optimization level that decreases with increasing an update frequency. Accordingly, a developer can dynamically set compiler options to each source program so as to balance the generating time of the execution module and an execution performance in an execution test without changing the compiler options while checking conditions of source programs one by one. As a result, a developer can develop software efficiently.

Further, a software development tool program according to a fourth aspect of the present invention that is constituted to solve the above-mentioned problem is a software development tool program to generate an execution module based on object programs that are obtained by compiling one or many source program, characterized in that, making a computer, which connects with an input device and a recording device in which a series of source programs used to generate an execution module are stored, accept an instruction to execute compilations of said series of source programs by said input device;

making the computer determine an evaluation period to which an elapsed time from an update time of each of said series of source programs in said recording device belongs among many evaluation periods having different sizes, when said input device accepts said instruction;

making the computer determine whether said series of source programs include information about an execution number of each of blocks dividing the source program in a predetermined size as profile information or not;

making the computer calculate the total of the execution numbers of the respective blocks as an execution cost for each of said series of source programs only when said series of source programs include said profile information;

making the computer calculate a ratio of the execution cost of each of said source programs to the total of the execution costs of said series of source programs as an execution frequency of each of said source programs;

making the computer determine an evaluation ratio range to which the calculated execution frequency of each of said source programs belongs among many evaluation ratio ranges having different sizes;

making the computer set an optimization option, for the source program whose elapsed time belongs to the maximum evaluation period among the evaluation periods, whose level is appropriate to its evaluation period, and set an optimization option, for the source program whose elapsed time does not belong to the maximum evaluation period, whose level is appropriate to the evaluation ratio range to which said execution frequency of the source program belongs;

making the computer compile each of said source programs with the optimization level shown by said optimization option that is independently set in each of said series of source programs; and making the computer record the respective object program obtained by said compilations into said recording device.

With this construction, when the instruction of an execution to compile the series of source programs is input to the input device, the optimization option with a low optimization level is set for a source program whose elapsed time from the update time is in the minimum level, the optimization option with an optimization level appropriate to its importance is set for a source program whose elapsed time from the update time is not in the minimum level. Since an optimization level of an optimization option set for a source program is raised or lowered in response to an importance and an update status of a source program, a source program whose elapsed time from the update time is in the minimum level is simply compiled with the optimization level that increases a generating speed of the execution module, a source program whose elapsed time from the update time is not in the minimum level is precisely compiled with the optimization level that increases with increasing an importance. Accordingly, a developer can dynamically set compiler options to each source program so as to balance the generating time of the execution module and an execution performance in an execution test without changing the compiler options while checking conditions of source programs one by one. As a result, a developer can develop software efficiently.

In addition, the software development tool programs according to the first through fourth aspects of the present invention may make a computer determine whether a designation to add an optimization cancel option or a debug option is set or not, when an instruction to execute compilations of a series of source programs is input into an input device. In such a case, if such a designation is set at the time when the input device accepted a compiling instruction, an optimization option set for a source program is exchanged for an optimization cancel option, and a debug option is additionally set to every source program. Accordingly, a developer can be freed from an operation for eliminating the possibility that a malfunction caused by the source program has an effect on another source program, that is, from an operation for changing the compiler options while checking conditions of source programs one by one. As a result, a developer can develop software efficiently.

As described above, according to the present invention, even if a developer does not change a setting of the compiler options frequently, compiler options can be dynamically changed so as to keep a balance between a generating time of an execution module and an execution performance. As a result, a developer can develop software efficiently.

BRIEF DESCRIPTION OF DRAWING

FIG. 5 is a schematic view showing a screen example of a post-update elapsed degree setting/input screen;

FIG. 6 is a schematic view showing a screen example of an execution frequency setting/input screen;

BEST MODE FOR CARRYING OUT THE INVENTION

Hereinafter, an embodiment of the present invention will be described with reference to drawings.

Figure 1:
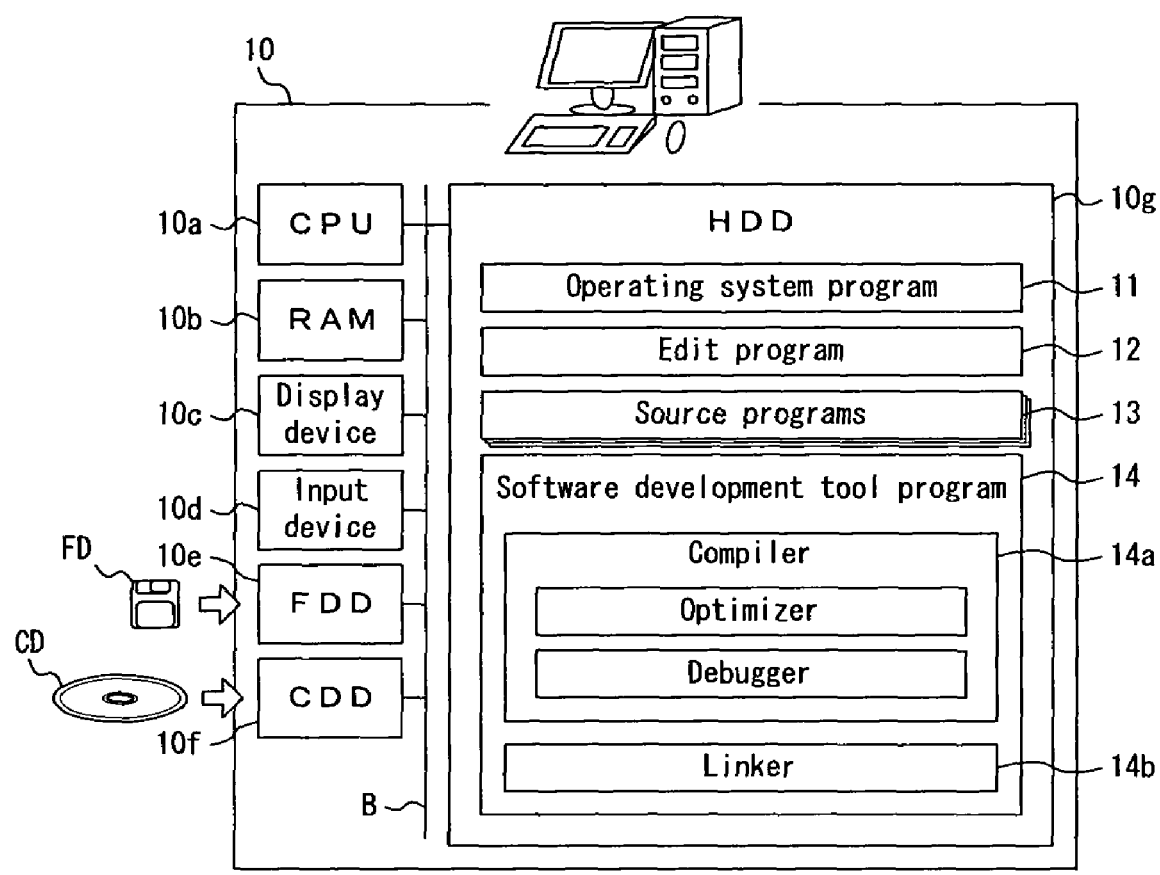
FIG. 1 is a block diagram that shows a general construction of a computer on which a software development tool program of the embodiment according to the present invention is executed.

FIG. 1 is a block diagram that shows a general construction of a computer 10 on which a software development tool program of the embodiment according to the present invention is executed. As shown in FIG. 1, the computer 10 is provided with a CPU (Central Processing Unit) 10a, a RAM (Random Access Memory) 10b, a display device 10c, an input device 10d, a FDD (Flexible Disk Drive) 10e, a CDD (Compact Disk Drive) 10f, and a HDD (Hard Disk Drive) 10g. These hardware elements 10a through 10g are connected to one another via a bus B.

The CPU 10a is a central processing unit that controls the entire system of the computer 10. The RAM 10b is a main memory on which a working area is developed when the CPU 10a executes various programs.

The display device 10c displays an image based on image data generated by the CPU 10a. Specifically, it is a CRT display, a liquid crystal display or the like. The input device 10d is a device that accepts an input of an operator. Specifically, it is a keyboard, a mouse, a touch screen, or the like.

The FDD 10e and the CDD 10f are devices that read data and programs from a computer readable medium such a flexible disk FD and a compact disk CD, and that writes data into these disks FD and CD. In addition, data or programs read from the respective disks FD and CD by the FDD 10e and the CDD 10f are installed into the HDD 10g.

The HDD 10g is a memory built in the computer 10 or externally connected thereto. The HDD 10g stores various programs that are loaded into the RAM 10b to be executed by the CPU 10a. The HDD 10g stores an operating system program 11 for totally managing hardware and software, an edit program 12, source programs 13, and a software development tool program 14.

The edit program 12 is a program that implements text editor's functions such as a text editing function, text data generating/updating functions on the computer 10. In addition, since a process executed by the CPU 10a according to the edit program 12 is popular, a description thereof is omitted.

The source programs 13 are text data described in a program language and there are many source programs stored in the HDD 10g. These source programs 13 may be written by an operator of the computer 10 or may be installed from a flexible disk FD and a compact disk CD into the HDD 10g.

In addition, in the following description, it is assumed that the series of source programs 13 in the HDD 10g are made as a program group that is used to generate an executable format program file (it is referred to as an "execution module" in the following description). However, many groups of the source programs 13 can be stored in the HDD 10g in reality.

The software development tool program 14 is a program group that implements functions of tools to accomplish a software development on the computer 10.

The software development tool program 14 includes a compiling module program (compiler) 14a that compiles a source program into machine language to generate an object program, a linking module program (linker) that links many object programs to generate one execution module.

Further, the compiler 14a includes an optimization module program (optimizer) that executes an optimization such as a deletion of unnecessary branches and an exchange of arithmetic order, a debug module program (debugger) that checks contents of a program and remove bugs (errors) therefrom.

In the meantime, the compiler 14a is constituted so as to compile a target source file when a compilation execution command is accepted. Further the compiler 14a is also constituted so as to accept information for selecting a few kinds of compilation. The information is referred to as compiler options. The compiler options include an optimization option that makes the optimizer accomplish an optimization concurrently with a compilation, an optimization cancel option that prevents an optimization, and a debug option that starts the debugger to debug a program concurrently with a compilation.

The optimization accomplished by the optimizer includes a few levels in accordance with a degree thereof. The higher the degree is, the longer the optimization time is. The number of the optimization options is equal to the number of the levels.

Therefore, when a user selects any one of the optimization options and adds it to the compilation execution command, a user can designate a level of the optimization to the compiler 14a.

And then, the software development tools that are implemented on the computer 10 by the software development tool program 14 is constituted so that initial values or desired values are set in the compiler options. When an execution module is generated, the compiler 14a compiles source programs with the compiler options that are set at the time.

The software development tool program 14 that is constituted as above dynamically changes the setting of the compiler options used at the time of a compilation as a function according to the present invention. This function according to the present invention will be described below using flowcharts in FIG. 2 and FIGS. 8 through 11.

In addition, the software development tool program 14 may be installed into the HDD 10g from the flexible disk FD or the compact disk CD.

Hereinafter, the process executed on the computer 10 ad constructed above will be described.

In the computer 10, when the input device 10d is operated by an operator, the CPU 10a loads the software development tool program 14, which starts a process to implement a function of the software development tool. This implements the software development tool on the computer 10.

The software development tool has functions other than functions according to the present invention, and the functions include a function of registering file names of a series of source programs 13 that are basis for generating an execution module. In the following description, it is assumed that file names of a series of source programs 13 have been registered to the software development tool in advance.

Further, the software development tool has a function of registering information about essential compiler options that must be set for the respective source programs before the series of program files 13 are compiled.

Still further, the software development tool has a function of keeping profile information about the series of source programs 13 when it has been obtained.

In addition, since the profile information is described in the publication (Japanese unexamined patent publication No. Hei 08-087417) that corresponds to the earlier application by the applicant, it is not described in detail. An outline of the profile information is as follows.

That is, the profile information is obtained, in the case where each of source programs 13 for generating an examination module is divided into some blocks, by counting an execution number of each block at the time of an examination test of the examination module. Therefore, when the source program 13 is compiled at the first time, there is no profile information about it. After the execution module is generated, profile information may be added to the source program 13.

Operating the input device 10d, an operator of the computer 10 uses the respective functions of the software development tool. As a result, when it is required to generate the execution module based on the series of source programs 13, the operator operates the input device to start a program for generating an execution module.

Figure 2:
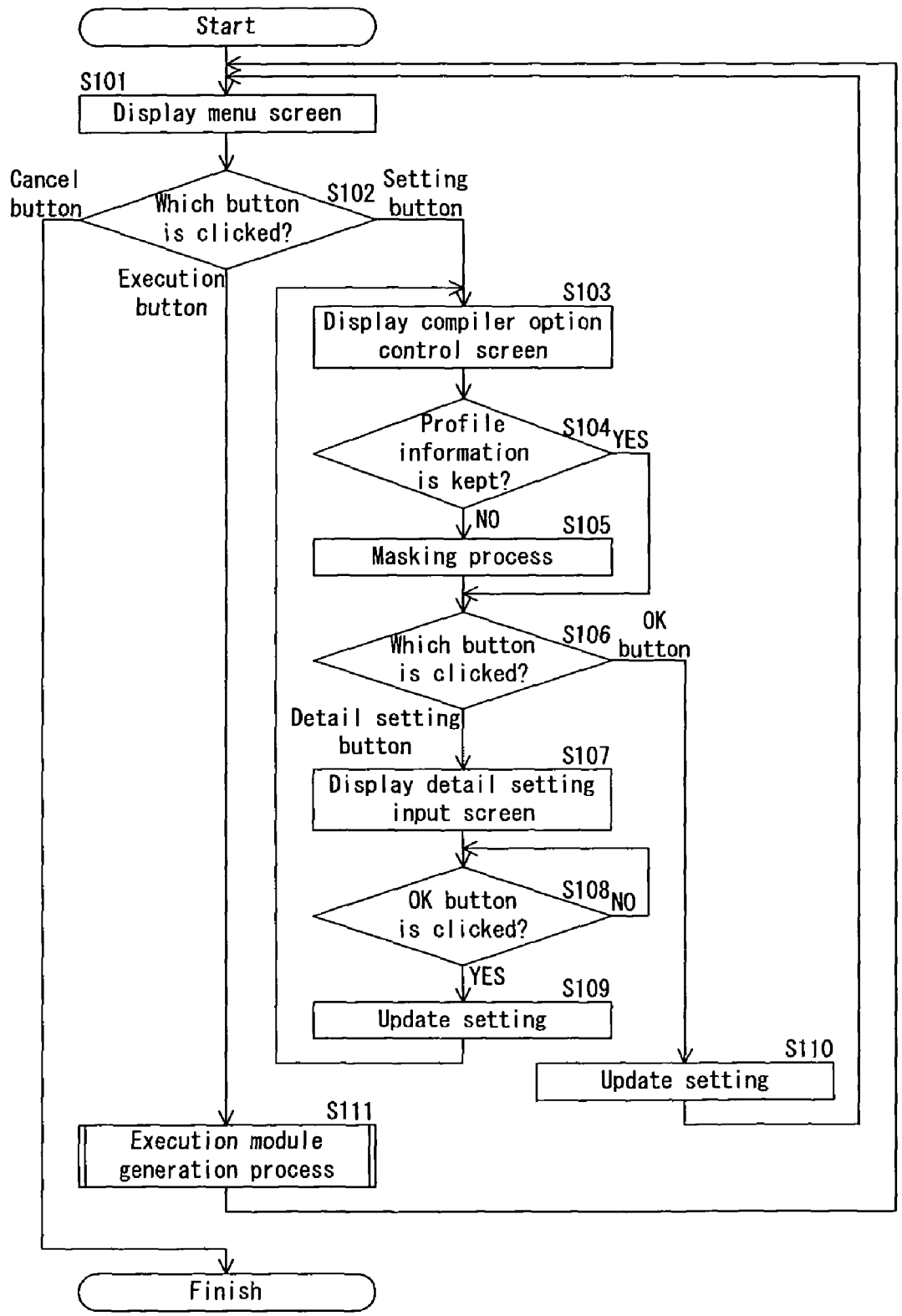
FIG. 2 is a flowchart for describing contents of a process by the software development tool program.

Then, when the CPU 10a of the computer 10 loads the program in question from the HDD 14 in response to the operation, a process for implementing a function for generating the execution module starts. FIG. 2 is a flowchart for describing contents of the process.

After starting the process, at a first step S101, the CPU 10a makes the display device 10c display a menu screen.

Figure 3:
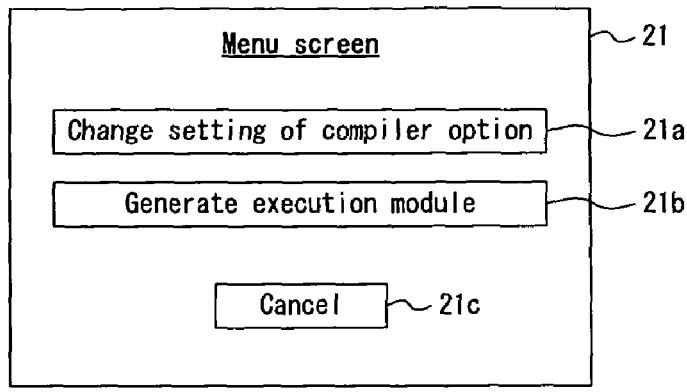
FIG. 3 is a schematic view showing a screen example of a menu screen.

FIG. 3 shows a sample screen of the menu screen. In the menu screen 21 shown in FIG. 3, three clickable buttons 21a though 21c are indicated. The first button 21a is a "setting" button that is clicked when an operator changes the setting of whether a dynamic change of compiler options that are automatically set to each of the series of source programs 13 at the time of compilation is allowed or not. The second button 21b is an "execution" button that is clicked by an operator when an execution module is generated based on the series of source programs 13. The third button 21c is a "cancel" button that is clicked by an operator when the function for generating an execution module halts.

After displaying such a menu screen 21 on the display device 10c, the CPU 10a waits until one of the clickable buttons 21a through 21c is clicked. Then, when one of the clickable buttons 21a through 21c is clicked, the CPU 10a advances the process to step S102.

At step S102, the CPU 10a determines which button among the buttons 21a through 21c on the menu screen is clicked. And then, when the "setting" button 21a is clicked, the CPU 10a advances the process to step S103.

At step S103, the CPU 10a makes the display device 10c display the compiler option control screen.

Figure 4:
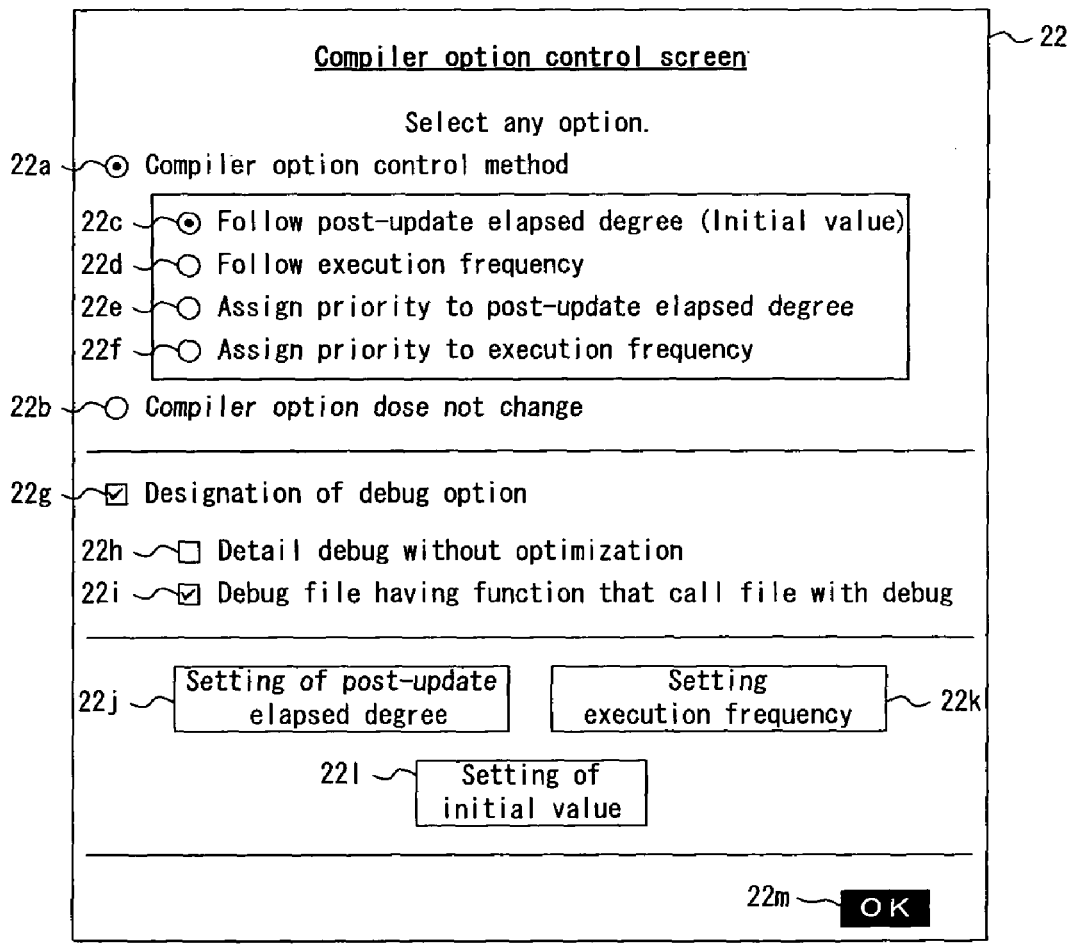
FIG. 4 is a schematic view showing a screen example of a compiler option control screen.

FIG. 4 shows a screen example of the compiler option control screen. Two radio buttons 22a and 22b are indicated on the compiler option control screen 22 shown in FIG. 4. The first radio button 22a is an "optimization dynamic designation" button that is clicked by an operator when the operator wants to dynamically change the setting of the optimization option among the compiler options used when the source programs 13 are compiled. The second radio button 22b is a "fixed designation" button that is clicked by an operator when the operator want to keep the compiler options as-is.

Further, four radio buttons 22c through 22f are indicated on the compiler option control screen 22 in FIG. 4. These buttons 22c through 22f function effectively only when the "optimization dynamic designation" button 22a is selected. The first radio button 22c is a "post-update elapsed degree order" button for designating a dynamic change of the optimization level in response to a post-update elapsed degree that is an elapse time from an update time of the source programs 13 to the present time. The second radio button 22d is an "execution frequency order" button for designating a dynamic change of the optimization level in response to an execution frequency that is a ratio of an execution cost (described below) of a source program 13 to the total sum of the execution costs of the series of source programs 13. The third radio button 22e is a "post-update elapsed degree priority" button for designating a dynamic change of the optimization level in response to the post-update elapsed degree when the ratio as the execution frequency is equal to or lower than a predetermined upper limit. The fourth radio button 22f is an "execution frequency priority" button for designating a dynamic change of the optimization level in response to the execution frequency when the elapse time as the post-update elapsed degree is equal to or higher than a predetermined lower limit time.

Further, on the compiler option control screen 22 shown in FIG. 4, a "designation of dynamic debug" check box 22g, which is clicked by an operator when the operator wants to dynamically change the debug option among the compiler options used when the source programs 13 are compiled, is indicated. In addition, the "debugging dynamic designation" check box 22g functions effectively only when the "optimization dynamic designation" button 22a is selected.

Further, on the compiler option control screen 22 in FIG. 4, two check boxes 22h and 22i, which function effectively only when a check mark is input in the "debugging dynamic designation" check box 22g, are indicated. The first check box 22h is a "detail debug" check box for designating an exchange of the optimization option used at the time of compilation of the source programs 13 with the optimization cancel option and an addition of the debug option. The second check box 22i is a "called function debug" check box for designating an exchange of the optimization option set for a source program 13 that includes a function for calling a function in the target source program 13 with the optimization cancel option and an addition of the debug option.

In addition, as described below, when the "called function debug" check box 22i is checked, the debug option is set not only for a source program 13 that includes a function for calling a function in the target source program 13 but also for a source program 13 that includes a function for calling a function in the calling source program 13, further for a source program 13 that includes a function for calling a function in the calling source program 13, . . . . In such a manner, the debug options are set for all the sequentially linked source programs 13.

Further, on the compiler option control screen 22 in FIG. 4, three clickable buttons 22j through 22l are indicated. The first button 22j is a "post-update elapsed degree setting" button that is clicked by an operator when a relationship between the evaluation condition of the post-update elapsed degree and the optimization level is changed. The second button 22k is an "execution frequency setting" button that is clicked by an operator when the evaluation condition of the execution frequency and the optimization level is changed. The third button 22l is an "initial value setting" button for designating a radio button, which becomes selected condition when the "dynamic optimization designation" button 22a is clicked, among four radio buttons 22c through 22f that function effectively when the "dynamic optimization designation" button 22a is selected.

Still further, on the compiler option control screen 22 in FIG. 4, an "OK" button 22m is indicated. The "OK" button 22m is clicked by an operator when input operations for the radio buttons 22a through 22f, the clickable buttons 22j through 22l, and check boxes 22g through 22i are finished.

Displaying such a compiler option control screen 22 on the display device 10c, the CPU 10a advances the process to step S104.

At step S104, the CPU 10a determines whether the profile information about the series of source programs 13 registered in advance is kept of not. If the profile information about the series of source programs 13 exists, the CPU 10a advances the process to step S106. If the profile information about the series of source programs 13 does not exist, the CPU 10a advances the process to step S105.

At step S105, the CPU 10a executes a masking process. Specifically, the CPU 10a executes a process that prohibits selecting the three radio buttons 22d through 22f shown on the compiler option control screen 22 in FIG. 4 so as to halt the functions thereof. After such a masking process is executed, the CPU 10a advances the process to step S106.

At step S106, the CPU 10a waits until one of the clickable buttons 22j through 22m on the compiler option control screen 22 is clicked. While the CPU 10a is waiting, input operations to the radio buttons 22a through 22f, the check boxes 22g through 22i on the compiler option control screen 22 are allowed. However, if the process goes through step S5, inputs to the radio buttons 22d through 22f are impossible.

And then, when one of the clickable buttons 22j through 22m is clicked, the CPU 10a determines which button is clicked. If the detail setting button is clicked, that is, one of the "post-update elapsed degree setting" button 22j, the "execution frequency setting" button 22k, and the "initial value setting" button 22l is clicked, the CPU 10a advances the process to step S107.

At step S107, the CPU 10a makes the display device 10c display the detail setting input screen corresponding to the clicked button. Specifically, when the "post-update elapsed degree setting" button 22j is clicked, the CPU 10a makes the display device 10c display the post-update elapsed degree setting/input screen 23 as shown in FIG. 5, when the "execution frequency setting" button 22k is clicked, the execution frequency setting/input screen 24 as shown in FIG. 6 is displayed, and when the "initial value setting" button 22l is clicked, the initial value setting/input screen 25 as shown in FIG. 7 is displayed on the display device 10c.

In addition, on the post-update elapsed degree setting/input screen 23 shown in FIG. 5, three text boxes 23a are indicated for optionally designating some evaluation conditions of the post-update elapsed degree. Further, on the post-update elapsed degree setting/input screen 23, three text boxes 23b are indicated for designating any optimization options for the post-update elapsed degrees within the ranges shown by the evaluation conditions. Further, on the post-update elapsed degree setting/input screen 23, a text box 23c is indicated for designating any optimization options for the post-update elapsed degrees beyond the range shown by the evaluation condition. Still further, on the post-update elapsed degree setting/input screen 23, an "OK" button 23d, which is clicked by an operator after finishing inputs to the respective text boxes 23a through 23c, is indicated.

In the execution frequency setting/input screen 24 shown in FIG. 6, three text boxes 24a are indicated for optionally designating some evaluation conditions of the execution frequency. Further, on the execution frequency setting/input screen 24, three text boxes 24b are indicated for designating any optimization options for the execution frequencies within the ranges shown by the evaluation conditions. Further, on the execution frequency setting/input screen 24, a text box 24c is indicated for designating any optimization options for the execution frequency beyond the range shown by the evaluation condition. Still further, on the execution frequency setting/input screen 24, an "OK" button 24d, which is clicked by an operator after finishing inputs to the respective text boxes 24a through 24c, is indicated.

Figure 7:
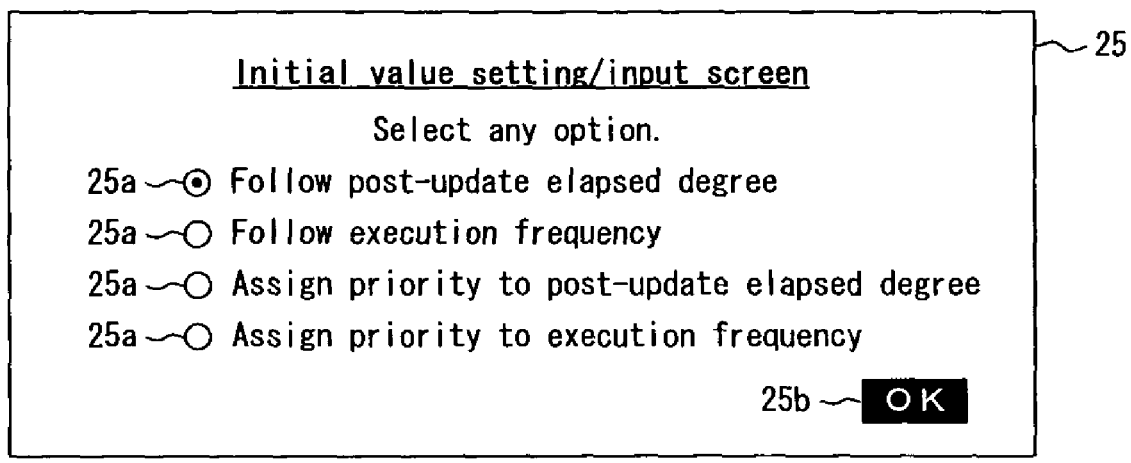
FIG. 7 is a schematic view showing a screen example of an initial value setting/input screen.

In the initial value setting/input screen 25 shown in FIG. 7, four radio buttons 25a are indicated. The four radio buttons 25a are used to predetermine which of the radio buttons 22c through 22f on the compiler option control screen 22 is selected when the "dynamic optimization designation" button 22a is clicked. Further, on the initial value setting/input screen 25, an "OK" button 25b, which is clicked by an operator after finishing selection of the radio buttons 25a, is indicated.

The CPU 10a makes the display device 10c display one of the screens shown in FIG. 5 through FIG. 7 corresponding to the clicked button as the detail setting input screen, and then advances the process to step S108.

At step S108, the CPU 10a waits until the "OK" button on the currently displayed detail setting input screen is clicked. In addition, while the CPU 10a is waiting, input operations to the text boxes (for the post-update elapsed degree setting/input screen 23 or the execution frequency setting/input screen) and the radio buttons (for the initial value setting/input screen 25) on the currently displayed detail setting input screen are allowed. When the "OK" button is clicked, the CPU 10a advances the process to step S109.

At step S109, the CPU 10a updates the evaluation condition of the post-update elapsed degree, the evaluation condition of the execution frequency, or the setting of the initial value based on the contents that have been input on the detail setting input screen at the time of the click of the "OK" button. After that, the CPU 10a returns the process to step S103 and makes the display device 10c display the compiler option control screen 22.

On the other hand, if the "OK" button 22m on the compiler option control screen 22 is clicked at step S106, the CPU 10a advances the process to step S110.

At step S110, the CPU 10a updates the method for dynamically changing the optimization option and/or the method for dynamically changing the debug option based on the contents that have been input on the compiler option control screen 22 at the time of the click of the "OK" button 22m. After that, the CPU 10a returns the process to step S101 and makes the display device 10c display the menu screen 21.

Further, if the "execution" button 21b on the menu screen 21 is clicked at step S102, the CPU 10a advances the process to step S111.

Figure 8:
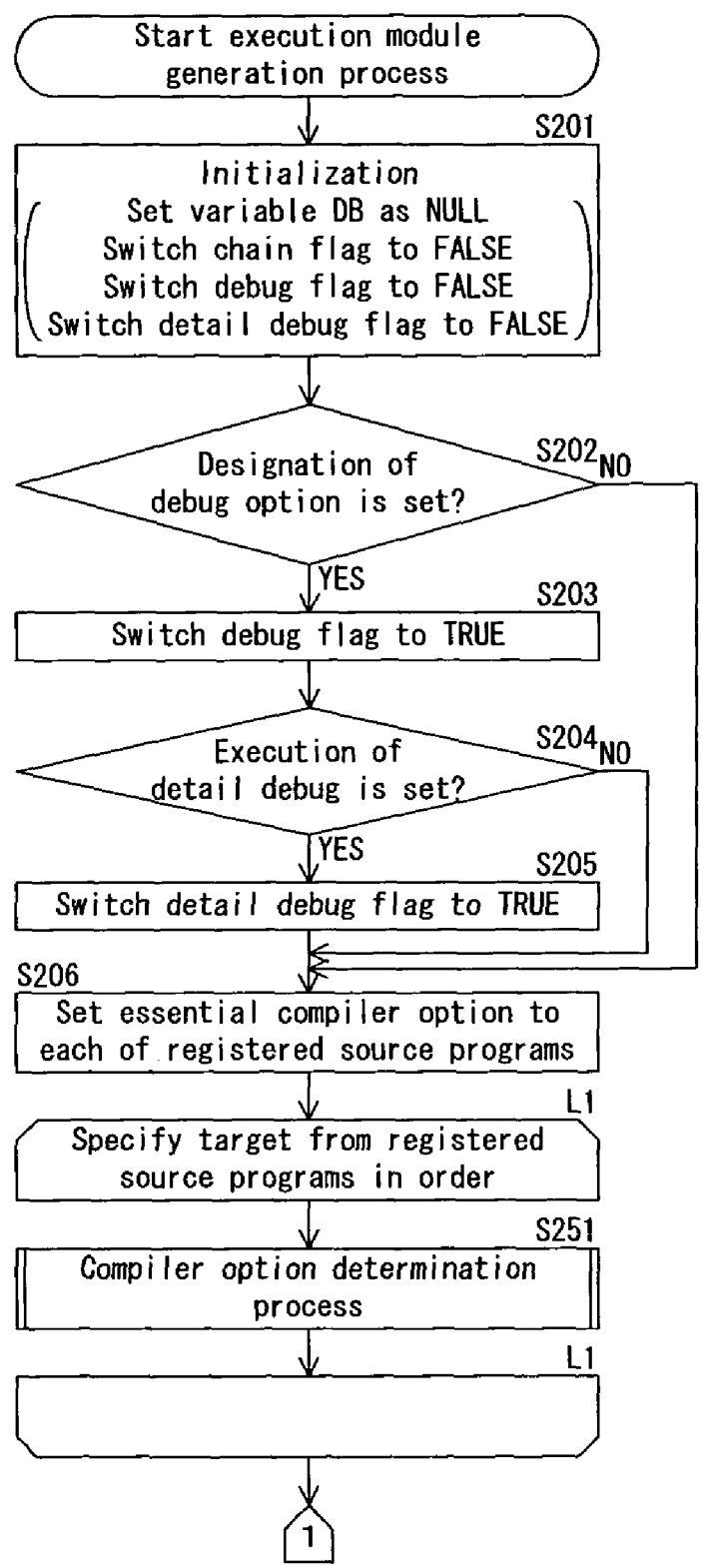
FIG. 8, FIG. 9 and FIG. 10 are flowcharts for describing contents of a process by an execution module generating subroutine.
Figure 9:
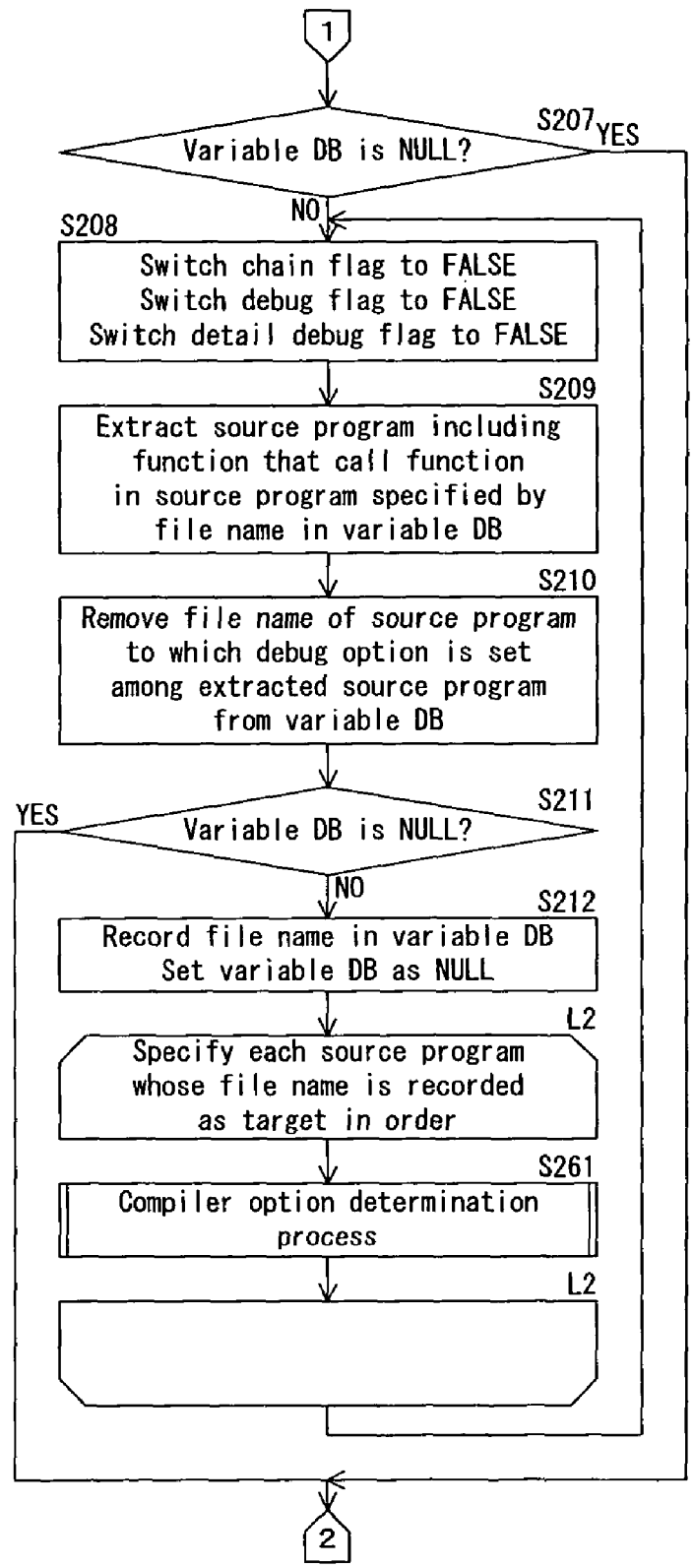
Figure 10:
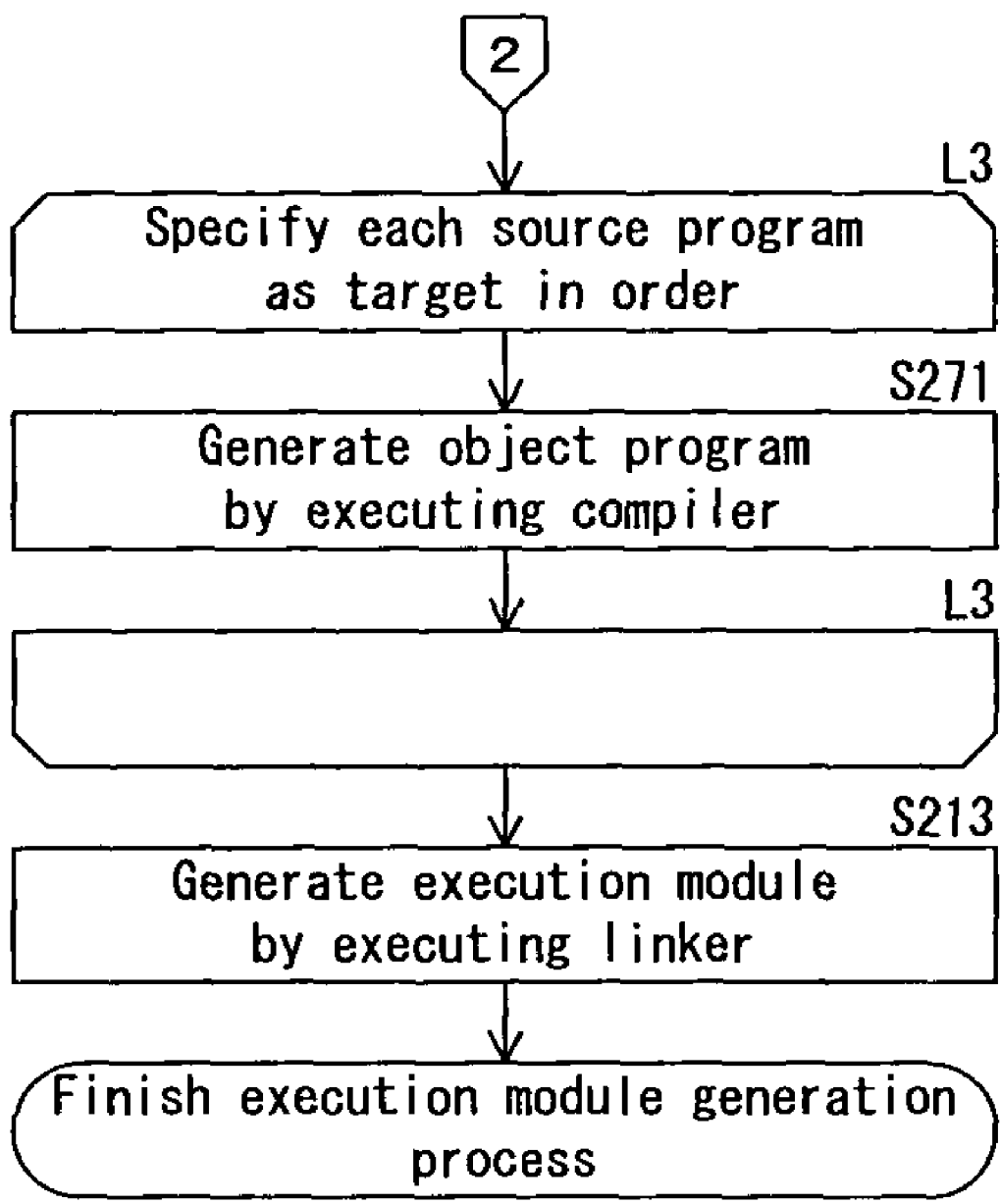

At step S111, the CPU 10a loads the execution module generating subroutine from the HDD 10g and starts to execute an execution module generation process. FIG. 8 through FIG. 10 are flowcharts for describing contents of the execution module generation process.

At the first step S201 of the execution module generation process, the CPU 10a executes an initializing process. Specifically, the CPU 10a sets a variable DB (database) as NULL condition (no data is entered) and substitutes FALSE for a chain flag, a debug flag, and a detail debug flag.

At the next step S202, the CPU 10a determines whether the "designation of debug option" setting is available or not. That is, the CPU 10a determines whether a check mark is input in the "dynamic debug designation" check box 22g on the compiler option control screen 22 in FIG. 4. If the "designation of debug option" setting is not available, the CPU 10a advances the process to step S206, if the "designation of debug option" setting is available, the CPU 10a advances the process to step S203.

At step S203, the CPU 10a switches the debug flag to TRUE and advances the process to step S204.

At step S204, the CPU 10a determines whether the "execution of detail debug" setting is available or not. That is, the CPU 10a determines whether a check mark is input in the "detail debug" check box 22h on the compiler option control screen 22 in FIG. 4 or not. And then, if the "execution of detail debug" setting is not available, the CPU 10a advances the process to step S206, and if the "execution of detail debug" setting is available, the CPU 10a advances the process to step S205.

At step S205, the CPU 10a switches the detail debug flag to TRUE and advances the process to step S206.

At step S206, the CPU 10a sets the essential compiler options that are individually defined to all the source programs 13 registered in advance, respectively. Specifically, the CPU 10a creates worktables for the respective source programs 13 in the RAM 10b, and records the file names of the source programs 13 and the essential compiler options into the corresponding worktables, respectively. After that, the CPU 10a executes a first process loop L1.

In the first process loop L1, the CPU 10a specifies the source programs 13 registered in advance as process targets one by one, so that the process at step S251 is repeatedly executed for each of the source programs 13.

At step S251, the CPU 10a loads the compiler option determination subroutine from the HDD 10g and starts to execute the compiler option determination process. FIG. 11 through FIG. 14 are flowcharts for describing contents of the compiler option determination process.

At the first step S301 of the compiler option determination process, the CPU 10a determines whether the chain flag is TRUE or FALSE. And then, the CPU 10a advances the process to step S328 if the chain flag is TRUE, or advances the process to step S302 if the chain flag is FALSE.

At step S302, the CPU 10a determines whether the "no-change of compiler option" setting is available or not. That is, the CPU 10a determines whether the "fixed designation" button 22b on the compiler option control screen 22 in FIG. 4 is selected or not. And then, if the "no-change of compiler option" setting is available, the CPU 10a finishes the compiler option determination process for the target source program, or if the "no-change of compiler option" setting is not available, the CPU 10a advances the process to step S303.

At step S303, the CPU 10a sets NULL to variables A and B (no value are substituted) and advances the process step S304.

At step S304, the CPU 10a determines whether the current setting uses the post-update elapsed degree or not. That is, the CPU 10a determines whether the "post-update elapsed degree order" button 22c, the "post-update elapsed degree priority" button 22e, or the "execution frequency priority" button 22f on the compiler option control screen 22 in FIG. 4 is selected or not. And then, if the current setting does not use the post-update elapsed degree, the CPU 10a advances the process to step S308, or if the current setting uses the post-update elapsed degree, the process is advanced to step S305.

At step S305, the CPU 10a obtains the update date and time of the target source program 13 as well as the present time and calculates the elapsed time from the update of the target source program 13 as a post-update elapsed degree.

At the next step S306, the CPU 10a determines the optimization option whose level is corresponding to the post-update elapsed degree calculated at step S305. That is, the CPU 10a retrieves the smallest evaluation condition from a few evaluation conditions that are set on the post-update elapsed degree setting/input screen 23 in FIG. 5 and that include the elapsed time as the post-update elapsed degree so as to determine the optimization option whose level is appropriate to the detected period condition as an optimization option corresponding to the post-update elapsed degree.

At the next step S307, the CPU 10a substitutes the optimization option determined at step S306 into the variable A, and advances the process to step S308.

At step S308, the CPU 10a determines whether the current setting uses the execution frequency or not. That is, the CPU 10a determines whether the current setting is equivalent to the condition where the "execution frequency order" button 22d, the "post-update elapsed degree priority" button 22e, or the "execution frequency priority" button 22f on the compiler option control screen 22 in FIG. 4 is selected or not. And then, if the execution frequency is not used, the CPU 10a advances the process to step S313. When the execution frequency is used, the process is advanced to step S309.

At step S309, the CPU 10a determines whether profile information about the series of source programs 13 that are registered in advance exists or not. If the profile information about the series of source programs 13 does not exist, the CPU 10a advances the process to step S313. If the profile information about the series of source programs 13 exists, the process is advanced to step S310.

At step S310, the CPU 10a calculates the execution frequency of the target source program 13. Specifically, at first, the CPU 10a obtains an execution cost for each of the source programs 13 by counting the total sum of execution numbers of all blocks of each of the source program 13 based on the profile information of all the source programs 13 that are registered in advance. Next, the CPU 10a calculates the total sum of the execution costs of all the source programs 13, and at last, the CPU 10a divides the execution cost of the target source program 13 by the total sum of the execution costs of all the source programs 13. The CPU 10a obtains the ratio, which is a result of the division, as an execution frequency of the target source program 13.

At the next step S311, the CPU 10a determines the optimization option whose level is appropriate to the execution frequency calculated at step S310. That is, the CPU 10a retrieves the highest evaluation condition that includes the ratio as the execution frequency from some evaluation conditions set on the execution frequency setting/input screen 24 in FIG. 6 so as to determines the optimization option whose level is appropriate to the retrieved evaluation condition as the optimization option corresponding to the execution frequency.

At the next step S312, the CPU 10a substitutes the optimization option determined at step S311 into the variable B and advances the process to step S313.

At step S313, the CPU 10a determines whether the current setting follows the post-update elapsed degree or not. That is, the CPU 10a determines whether the current setting is equivalent to the condition where the "post-update elapsed degree order" button 22c on the compiler option control screen 22 in FIG. 4 is selected or not. And then, if the current setting follows the post-update elapsed degree, the CPU 10a advances the process to step S314.

At step S314, the CPU 10a adds the optimization option substituted in the variable A to the worktable that is prepared in the RAM 10b for the target source program 13.

At the next step S315, the CPU 10a determines whether the optimization option substituted in the variable A is the optimization option with the highest level or not. That is, the CPU 10a determines whether the post-update elapsed degree satisfies the evaluation condition with the shortest time among many evaluation conditions that are set on the post-update elapsed degree setting/input screen 23 in FIG. 5 or not. And then, if the optimization option substituted in the variable A has the highest level, the CPU 10a advances the process to step S328. If the optimization option substituted in the variable A does not have the highest level, the CPU 10a finishes the compiler option determination process with respect to the target source program.

On the other hand, if it is determined that the current setting does not follow the post-update elapsed degree at step S313, the CPU 10a advances the process to step S316.

At step S316, the CPU 10a determines whether the current setting follows the execution frequency or not. That is, the CPU 10a determines whether the current setting is equivalent to the condition where the "execution frequency order" button 22d on the compiler option control screen 22 in FIG. 4 is selected or not. And then, if the setting follows the execution frequency, the CPU 10a advances the process to step S317.

At step S317, the CPU 10a adds the optimization option substituted in the variable B to the worktable that is prepared in the RAM 10b for the target source program 13.

At the next step S318, the CPU 10a determines whether the optimization option substituted in the variable B is the optimization option with the highest level or not. That is, the CPU 10a determines whether the execution frequency satisfies the evaluation condition with the highest ratio among many evaluation conditions that are set on the execution frequency setting/input screen 24 in FIG. 6 or not. And then, if the optimization option substituted in the variable B has the highest level, the CPU 10a advances the process to step S328. If the optimization option substituted in the variable B does not have the highest level, the CPU 10*a* finishes the compiler option determination process with respect to the target source program.

On the other hand, if it is determined that the current setting does not follow the execution frequency at step S316, the CPU 10*a* advances the process to step S319.

At step S319, the CPU 10*a* determines whether the current setting assigns priority to the post-update elapsed degree or not. That is, the CPU 10*a* determines whether the current setting is equivalent to the condition where the "post-update elapsed degree priority" button 22*e* on the compiler option control screen 22 in FIG. 4 is selected or not. And then, if the setting assigns priority to the post-update elapsed degree, the CPU 10*a* advances the process to step S320.

At step S320, the CPU 10*a* determines whether the optimization option substituted in the variable B is the optimization option with the highest level or not. And then, if the optimization option substituted in the variable B has the highest level, the CPU 10*a* advances the process to step S321.

At step S321, the CPU 10*a* adds the optimization option substituted in the variable B to the worktable that is prepared in the RAM 10*b* for the target source program 13 and advances the process to step S328.

On the other hand, if it is determined that the optimization option substituted in the variable B does not have the highest level at step S320, the CPU 10*a* advances the process to step S322.

At step S322, the CPU 10*a* adds the optimization option substituted in the variable B to the worktable that is prepared in the RAM 10*b* for the target source program 13 and advances the process to step S323.

At step S323, the CPU 10*a* determines whether the optimization option substituted in the variable A is the optimization option with the highest level or not. And then, if the optimization option substituted in the variable A has the highest level, the CPU 10*a* advances the process to step S328. If the optimization option substituted in the variable A does not have the highest level, the CPU 10*a* finishes the compiler option determination process with respect to the target source program.

Further, if it is determined that the current setting does not assign priority to the post-update elapsed degree at step S319, the CPU 10*a* assumes that priority is assigned to the execution frequency and advances the process to step S324. That is, the CPU 10*a* assumes that the current setting is equivalent to the condition where the "post-update elapsed degree priority" button 22*e* on the compiler option control screen 22 in FIG. 4 is selected, and advances the process to step S324.

At step S324, the CPU 10*a* determines whether the optimization option substituted in the variable A is the optimization option with the highest level or not. And then, if the optimization option substituted in the variable A has the highest level, the CPU 10*a* advances the process to step S325.

At step S325, the CPU 10*a* adds the optimization option substituted in the variable A to the worktable that is prepared in the RAM 10*b* for the target source program 13 and advances the process to step S328.

On the other hand, if it is determined that the optimization option substituted in the variable A does not have the highest level at step S324, the CPU 10*a* advances the process to step S326.

At step S326, the CPU 10*a* adds the optimization option substituted in the variable B to the worktable that is prepared in the RAM 10*b* for the target source program 13 and advances the process to step S327.

At step S327, the CPU 10*a* determines whether the optimization option substituted in the variable B is the optimization option with the highest level or not. And then, if the optimization option substituted in the variable B does not have the highest level, the CPU 10*a* finishes the compiler option determination process with respect to the target source program. If the optimization option substituted in the variable B has the highest level, the CPU 10*a* advances the process to step S328.

At step S328, the CPU 10*a* determines whether the debug flag is TRUE or not. If the debug flag is FALSE, the CPU 10*a* finishes the compiler option determination process with respect to the target source program. If the debug flag is TRUE, the process is advanced to step S329.

At step S329, the CPU 10*a* adds the debug flag to the worktable that is prepared in the RAM 10*b* for the target source program 13 and advances the process to step S330.

At step S330, the CPU 10*a* determines whether the current setting is to add the debug option to a source program having call function or not. That is, the CPU 10*a* determines whether the current setting is equivalent to the condition where a check mark is input in the "call function debug" check box 22*i* on the compiler option control screen 22 in FIG. 4 or not. And then, if the setting does not add the debug option to a source program having a call function, the CPU 10*a* advances the process to step S332. If the setting adds the debug option to a source program having a call function, the CPU 10*a* advances the process to step S331.

At step S331, the CPU 10*a* incrementally adds the file name of the target source program 13 to the variable DB and advances the process to step S332.

At step S332, the CPU 10*a* determines whether the detail debug flag is TRUE or not. And then, if the detail debug flag is FALSE, the CPU 10*a* finishes the compiler option determination process with respect to the target source program. If the detail debug flag is TRUE, the process is advanced to step S333.

At step S333, the CPU 10*a* replaces the optimization option that is set for the target source program 13 with the optimization cancel option. Specifically, the CPU 10*a* overwrites and updates the optimization option in the worktable prepared in the RAM 10*b* for the target source program 13 with the optimization cancel option. After that, the CPU 10*a* finishes the compiler option determination process with respect to the target source program.

The CPU 10*a* repeatedly executes the above-mentioned compiler option determination process for the respective source programs 13 that are registered in advance in the first process loop L1 in FIG. 8 and thereby sets the compiler options for all the registered source programs 13. And then, after escaping the first process loop L1, the CPU 10*a* advances the process to step S207 in FIG. 8.

At step S207, the CPU 10*a* determines whether the variable DB is a NULL condition (no data is entered) or not. And then, when the variable DB is NULL condition, the CPU 10*a* advances the process to the third process loop L3. When the variable DB is not NULL condition, the process is advanced to step S208.

At step S208, the CPU 10*a* switches the chain flag, the debug flag, and the detail debug flag to TRUE and advances the process to step S209.

At step S209, the CPU 10*a* extracts file names of the source programs 13 including functions that call functions included in the source programs whose file names are substituted in the variable DB. Specifically, the CPU 10*a* searches the respective source programs 13 for the call function as a search condition and specifies the file names of the source programs from which the call function is detected.

At the next step S210, the CPU 10a removes the file names of the certain source programs 13 from the variable DB. The Certain source programs 13 are extracted at step S209 with reference to the worktable in the RAM 10b and the debug option has been set thereto.

At the next step S211, the CPU 10a determines whether the variable DB is NULL condition in which no data is entered or not. And then, when the variable DB is not NULL condition, the CPU 10a advances the process to step S212.

At step S212, the CPU 10a reads the file names substituted in the variable DB and temporary records them into the RAM 10b. Further, the CPU 10a sets the variable DB as NULL condition in which no data is entered.

After the execution of step S212, the CPU 10a executes the second process loop L2 with respect to the source programs 13 whose file names are temporary recorded in the RAM 10b.

In the second process loop L2, the CPU 10a specifies a target from the temporary recorded source programs 12 in order and repeatedly executes the process of S261 with respect to the respective targets.

At step S261, the CPU 10a loads the compiler option determination subroutine from the HDD 10g to start the compiler option determination process. In addition, the contents of the compiler option determination process have been already described as above, detail descriptions thereof are omitted. The outline of the process is as follows.

Figure 11:
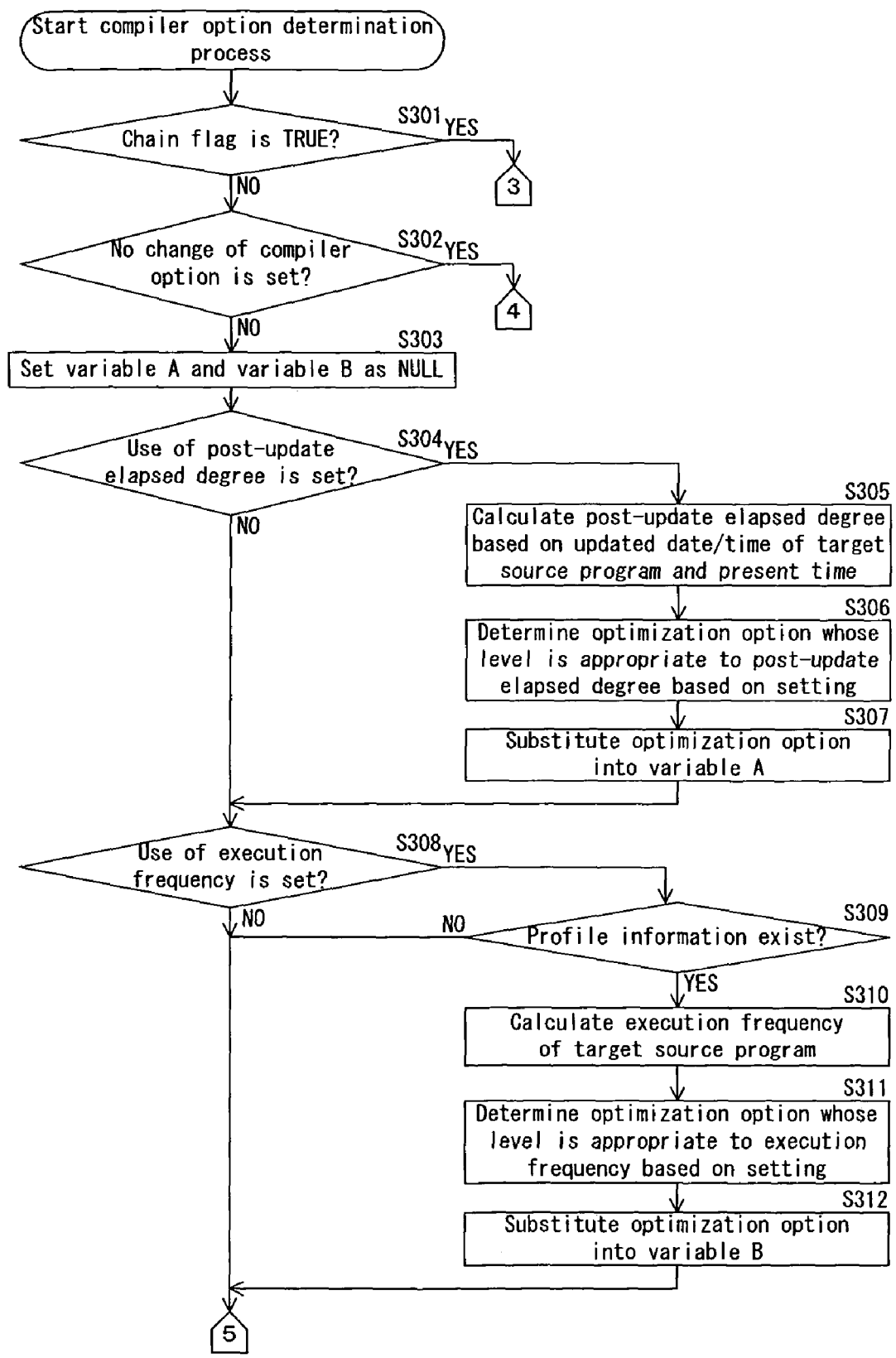
FIG. 11, FIG. 12, FIG. 13 and FIG. 14 are flowcharts for describing contents of a process by a compiler option determination subroutine.
Figure 12:
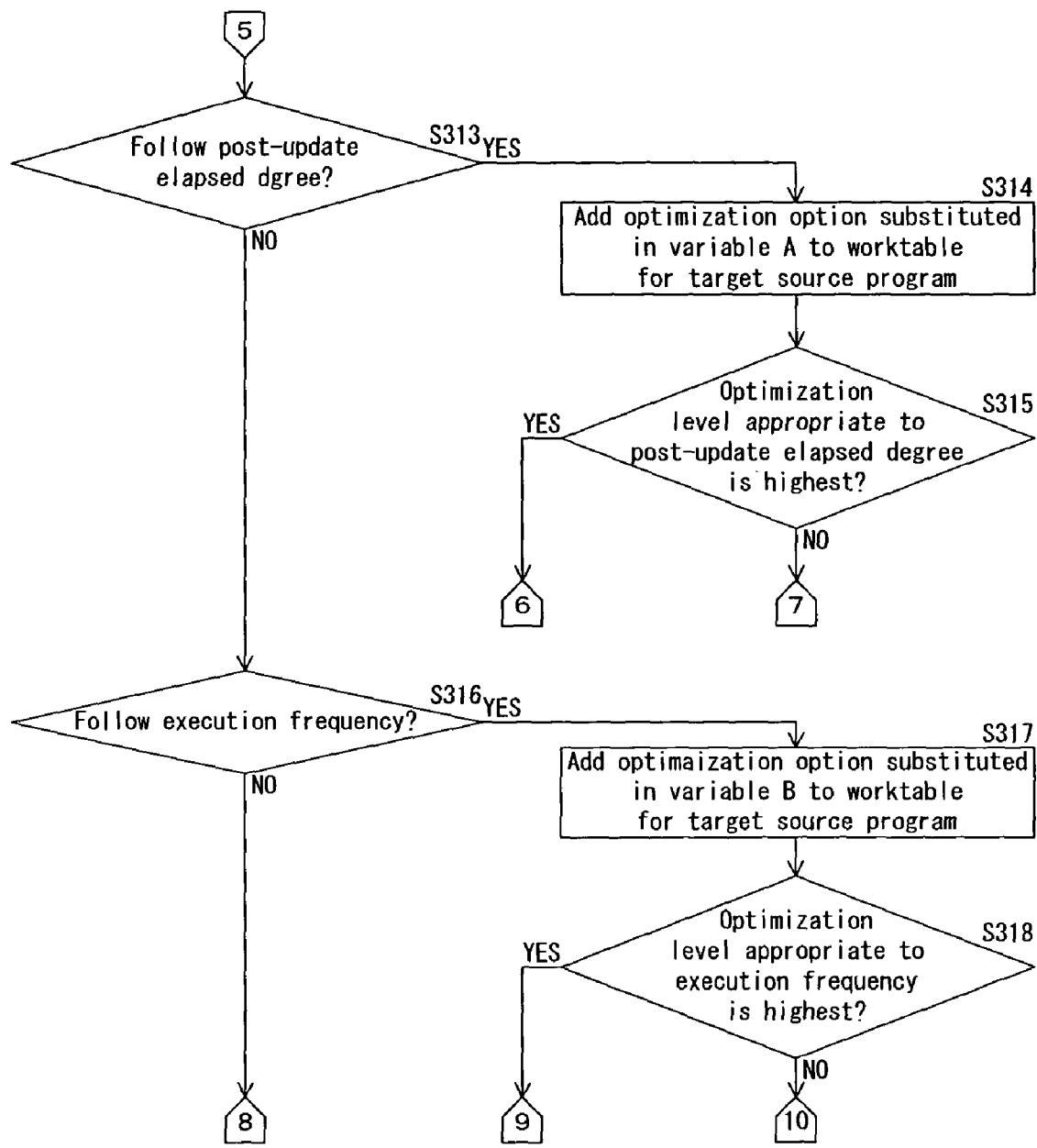
Figure 13:
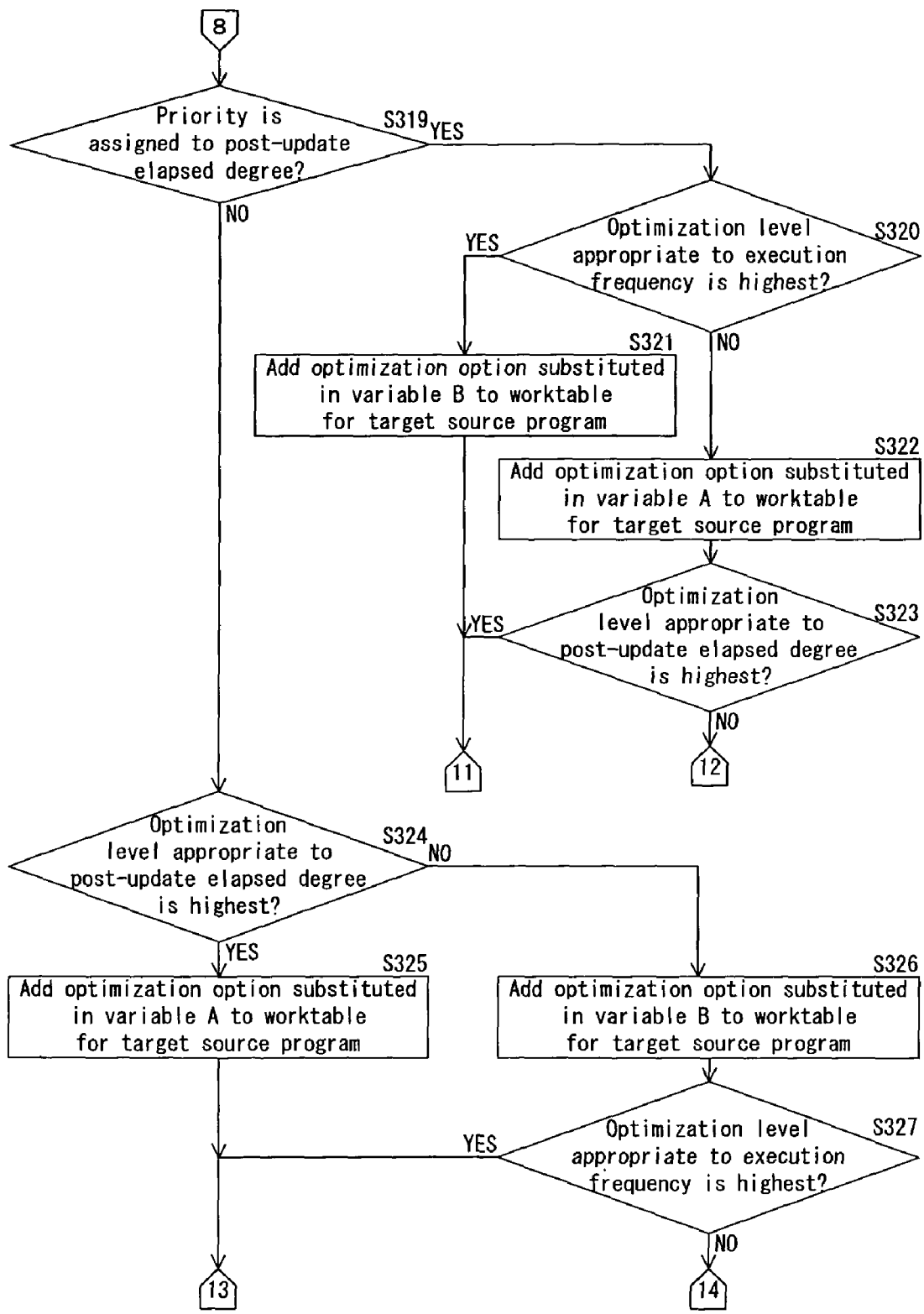
Figure 14:
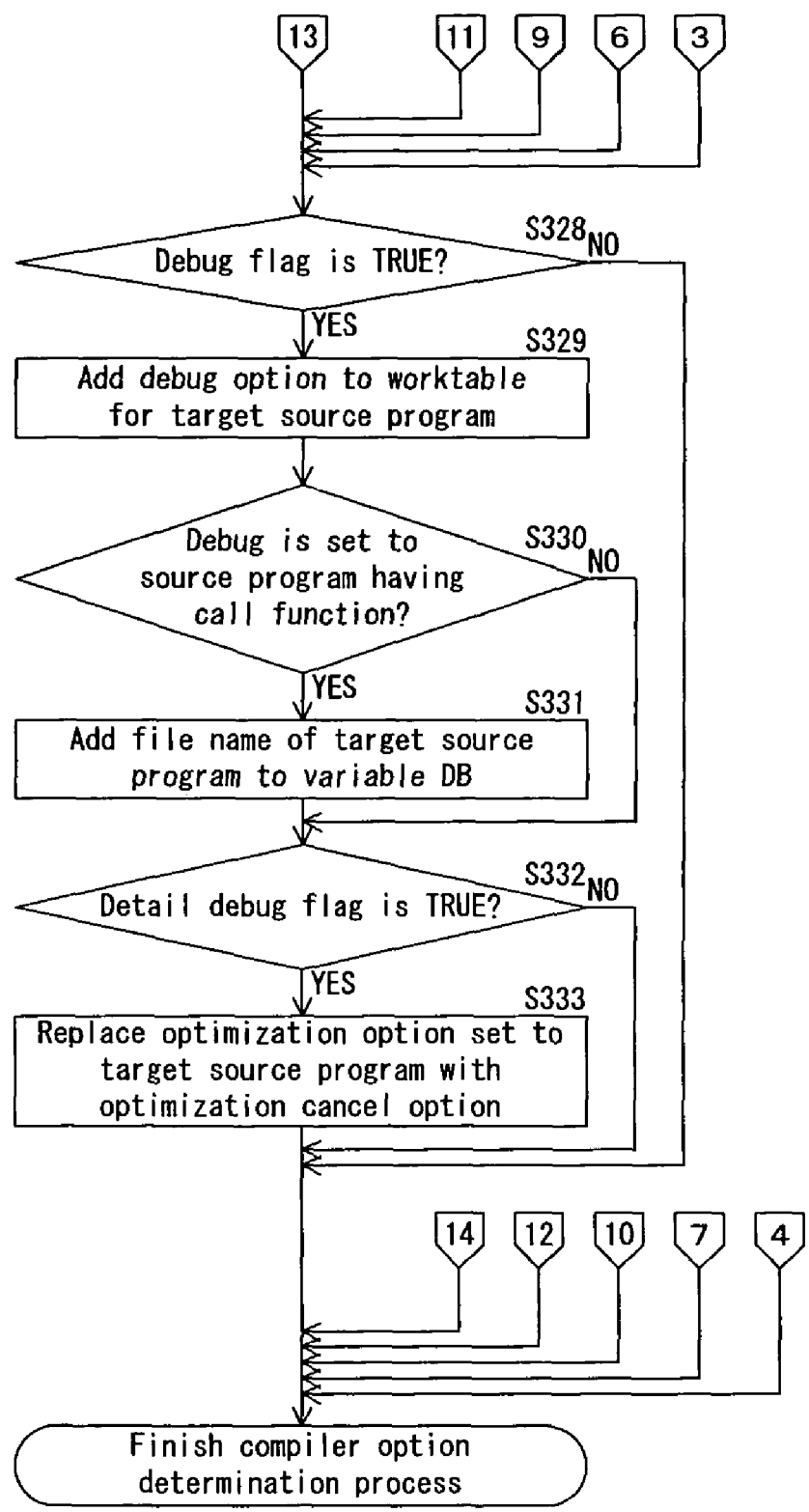

After starting the compiler option determination process, the CPU 10a determines that the chain flag is TRUE and advances the process from step S301 in FIG. 11 to step S328 in FIG. 14. Next, the CPU 10a adds the debug option to the worktable for the target source program 13 at step S329, additionally substitutes the file name of the target source program 13 to the variable DB at step S331, and replaces the optimization option recorded in the worktable for the target source program with the optimization cancel option at S333.

The CPU 10a executes the above-mentioned compiler option determination process in the second process loop L2 in FIG. 9 with respect to each of the source programs 13 whose file names are temporary recorded in the RAM 10b. As a result, the debug option is applied to every source programs 13. After escaping the second process loop L2, the CPU 10a returns the process to step S208.

In addition, when the process including steps S208 through S212 and the second process loop L2 is executed for the first time, a source program 13 including a function that calls a function in the series of source programs 13 that are registered in advance is extracted as a target in the process loop for the first time. Further, if the variable DB is not NULL condition after the process loop is executed for the first time, the process loop for the second time is executed. In such a case, a source program 13 including a function that calls a function in the source program as the target for the first time is extracted as a target in the process loop for the second time. Still further, if the variable DB is not NULL condition after the process loop is executed for the second time, the process loop for the third time is executed. In such a case, a source program 13 including a function that calls a function in the source program as the target for the second time is extracted as a target in the process loop for the third time.

As described above, when the process loop including steps S208 through S212 and the second process loop L2 is repeatedly executed, the debug options are assigned to the chained source programs in order. And then, if the debug options are assigned to all the target source programs after a number of executions of the process loop, the variable DB keeps NULL condition, which converges the chain linkage.

If the variable DB becomes NULL condition after a number of executions of the process loop and before the second process loop L2 is executed, the CPU 10a branches the loop from step S211 and advances to a third process loop L3.

In the third process loop L3, the CPU 10a specifies a target from the series of source programs 13 in order and repeatedly executes the process of step S271 with respect to the respective targets.

At step S271, the CPU 10a reads all the compiler options from the worktable that is prepared in the RAM 10b for the target source program 13. Next, the CPU 10a starts the compiler 14a to compile the target source programs 13 with the read compiler options and records the object programs generated by the compilation into the HDD 10g.

In the third process loop L3, the CPU 10a repeatedly executes the above-mentioned compilation of the respective source programs 13. As a result, all the source programs 13 are compiled. After escaping from the third process loop L3, the CPU 10a advances the process to step S213.

At step S213, the CPU 10a starts the linker 14b and makes the linker 14b link all the object programs generated in the third process loop L3 to generate an execution module. Further, the CPU 10a records the execution module into the HDD 10g. After that, the CPU 10a finishes the execution module generation process and advances the process to step S101 in FIG. 2. At step S101, the CPU 10a makes the display device 10c display the menu screen 21.

Further, when the "cancel" button 21c is clicked on the menu screen 21 at step S102, the CPU 10a finishes the main routine in FIG. 2.

Since the above-described process is executed, the computer 10 of the embodiment acts as follows.

First, the software developer starts the edit program 12 by operating the input device 10d of the computer 10 to implement a function of a text editor on the computer 10. And then, a developer edits the source program 13 and records the source program 13 into the HDD 10g.

Next, the software developer starts the software development tool program 14 by operating the input device 10d to implement the software development tool on the computer 10. When the developer generates the execution module based on the created source program 13, the developer performs operation to start a program for generating an execution module. Then, the menu screen 21 is displayed on the display device 10c of the computer 10 (S101).

The software developer can generate the execution module based on the series of source programs 13 (S111) by clicking the execution button 21b (S102; execution button). When the fixed designation button 22b on the compiler option control screen 22 in FIG. 4 has been selected, the essential compiler options that are defined in advance are used for the respective source programs at the time of compilation for generating an execution module in the same manner as the conventional compilation.

On the contrary, when a software developer clicks the setting button 21a (S102; setting button) before clicking the execution button 21b while the menu screen 21 is displayed, and the developer selects the "dynamic optimization designation" button 22a and the "post-update elapsed degree order" button 22c and clicks the "OK" button 22m (S103, S106, S110) on the compiler option control screen 22 in FIG. 4, the optimization option used for the source program 13 is dynamically changed to the appropriate optimization option in response to the post-update elapsed degree (L1, S251, S304 through S307, S313 through S315) at the time of compilation.

As a result, the software developer can simply compile a frequently revised and updated source program 13 with the optimization level that increases the generating speed of the execution module. On the contrary, the source program 13 that is not updated frequently can be precisely compiled with the optimization level that increases the execution performance of the execution module in the execution test.

Further, when a software developer clicks the setting button 21a (S102; setting button) before clicking the execution button 21b while the menu screen 21 is displayed, and the developer selects the "dynamic optimization designation" button 22a and the "execution frequency order" button 22d and clicks the "OK" button 22m (S103, S106, S110) on the compiler option control screen 22 in FIG. 4, the optimization option used for the source program 13 is dynamically changed to the appropriate optimization option in response to the execution frequency (L1, S251, S308 through S312, S316 through S318) at the time of compilation. As a result, the software developer can precisely compile the source program 13 that has high execution frequency with the optimization level that increases the execution performance of the execution module in the execution test. On the contrary, the software developer can simply compile the source program 13 that has low execution frequency with the optimization level that increases the generating speed of the execution module.

Further, when the software developer clicks the setting button 21a (S102; setting button) before clicking the execution button 21b while the menu screen 21 is displayed, and the developer selects the "dynamic optimization designation" button 22a and the "post-update elapsed degree priority" button 22e and clicks the "OK" button 22m (S103, S106, S110) on the compiler option control screen 22 in FIG. 4, the optimization option used for the source program 13 is dynamically changed to the appropriate optimization option so as to keep a balance between a generating time of the execution module and the execution performance in the execution test (L1, S251, S303 through S312, S319 through S323) at the time of compilation. As a result, the software developer can precisely compile the source program 13 whose execution frequency is as high as a predetermined level with the optimization level that increases the execution performance of the execution module in the execution test. On the contrary, the software developer can simply compile the source program 13 whose execution frequency is not as high as the predetermined level with the optimization level that becomes lower as the source program is frequently revised and updated.

Further, when the software developer clicks the setting button 21a (S102; setting button) before clicking the execution button 21b while the menu screen 21 is displayed, and the developer selects the "dynamic optimization designation" button 22a and the "execution frequency priority" button 22f and clicks the "OK" button 22m (S103, S106, S110) on the compiler option control screen 22 in FIG. 4, the optimization option used for the source program 13 is dynamically changed to the appropriate optimization option so as to keep a balance between the generating time of the execution module and the execution performance in the execution test (S303 through S312, S324 through S327) at the time of compilation. As a result, the software developer can simply compile the source program 13 whose execution frequency is as low as a predetermined level with the optimization level that increases the generating speed of the execution module. On the contrary, the software developer can precisely compile the source program 13 whose execution frequency is not as low as the predetermined level with the optimization level that becomes higher as the source program is frequently revised and updated.

Further, when the software developer clicks the setting button 21a (S102; setting button) before clicking the execution button 21b while the menu screen 21 is displayed, and the developer selects the "dynamic optimization designation" button 22a, inputs the check mark in the "designation of dynamic debug" check box 22g, and clicks the "OK" button 22m (S103, S106, S110) on the compiler option control screen 22 in FIG. 4, the debug option is added to the source program 13 (S202, S203, S204; NO, L1, S251, S328, S329, S330; NO, S332; NO) at the time of compilation. As a result, the software developer can easily set the debug options to the series of source programs 13.

Further, when the software developer clicks the setting button 21a (S102; setting button) before clicking the execution button 21b while the menu screen 21 is displayed, and the developer selects the "dynamic optimization designation" button 22a, inputs the check marks in the "designation of dynamic debug" check box 22g and the "detail debug" check box 22h and clicks the "OK" button 22m (S103, S106, S110) on the compiler option control screen 22 in FIG. 4, the debug option is added to the source program 13 (S202 through S205, L1, S251, S328, S329, S330; NO) and the optimization option used to the source program 13 is replaced by the optimization cancel option (S332, S333) at the time of compilation. As a result, the software developer can eliminate the possibility that the detail debugging will be omitted due to coexistence of the optimization option and the debug option.

Further, when the software developer clicks the setting button 21a (S102; setting button) before clicking the execution button 21b while the menu screen 21 is displayed, and the developer selects the "dynamic optimization designation" button 22a, inputs the check marks in the "designation of dynamic debug" check box 22g and the "called function debug" check box 22i and clicks the "OK" button 22m (S103, S106, S110) on the compiler option control screen 22 in FIG. 4, the debug option is added to the target source program 13 (S202 through S205, L1, S251, S328, S329), the debug option is added and the optimization option is replaced by the optimization cancel option with respect to a source program 13 that includes a function to call a function in the target source file (S208 through S212, L2, S301; YES, S328 through S333). Still further, the debug option is added and the optimization option is replaced by the optimization cancel option with respect to all the sequentially linked source programs 13 such as a source-program 13 that includes a function for calling a function in the source program 13, a source program 13 that includes a function for calling a function in the calling source program 13, and soon (S208 through S212, L2, S301; YES, S328 through S333). As a result, when the source program 13 causes a malfunction and the malfunction may be caused by a source program called by a function in the source program 13, the software developer is not required to check each of the source programs to set the debug option.

In addition, in the above description of the embodiment, it is assumed that the objects are linked by the linker 14b. Developing environments requiring such a linker 14b includes, for example, software developing environments where C language (trademark of AT&T), C++ (trademark of AT&T), FORTRAN (trademark of IBM) are used as programming languages. However, the present invention is not limited to the software environment that requires the linker 14b. That's because the object linking function by the linker 14b is irrelevant to the dynamic setting function of the compiler options according to the present invention. Therefore, the present invention has a sufficient effect, that is, the compiler options are dynamically set in response to the condition of the source programs 13 at the time of compilation, even in such a software developing environment that does not require the linker 14b. Such a software developing environment that does not require the linker 14b includes, for example, a software developing environment where Java (trademark of Sum Microsystems) is used as programming languages.

The invention claimed is:

1. A software development tool program stored in a memory to generate an execution module based on object programs that are obtained by compiling one or many source program, comprising:
   making a computer, which connects with an input device and a recording device in which a series of source programs used to generate an execution module are stored, accept an instruction to execute compilations of said series of source programs by said input device;
   making the computer determine an evaluation period to which an elapsed time from an update time of each of said series of source programs in said recording device belongs among many evaluation periods having different sizes, when said input device accepts said instruction;
   making the computer set an optimization option, for each of said series of source programs, whose level is appropriate to the evaluation period to which an elapsed time of a source program itself belongs;
   making the computer compile each of said source programs with the optimization level shown by said optimization option that is independently set in each of said series of source programs; and
   making the computer record the respective object programs obtained by said compilations into said recording device.

2. The software development tool program according to claim 1, further comprising:
   making said computer accept an input for changing the optimization level appropriate to the evaluation period by said input device before said input device accepts said instruction; and
   making said computer change the correspondence between said evaluation period and said optimization level in response to said input when said input device accepts said input.

3. A software development tool program stored in a memory to generate an execution module based on object programs that are obtained by compiling one or many source program, comprising:
   making a computer, which connects with an input device and a recording device in which a series of source programs used to generate an execution module are stored, accept an instruction to execute compilations of said series of source programs by said input device;
   making the computer determine whether each of said series of source programs in said recording device includes information about an execution number of each of blocks dividing the source program in a predetermined size as profile information or not, when said input device accepts said instruction;
   making the computer calculate the total of the execution numbers of the respective blocks as an execution cost for each of said series of source programs only when said series of source programs include said profile information;
   making the computer calculate a ratio of the execution cost of said source program to the total of the execution costs of said series of source programs as an execution frequency of each of said source programs;
   making the computer determine an evaluation ratio range to which the calculated execution frequency of each of said source programs belongs among many evaluation ratio ranges having different sizes;
   making the computer set an optimization option, for each of said series of source programs, whose level is appropriate to the evaluation ratio range to which an execution frequency of a source program itself belongs;
   making the computer compile each of said source programs with the optimization level shown by said optimization option that is independently set in each of said series of source programs; and
   making the computer record the respective object program obtained by said compilations into said recording device.

4. The software development tool program according to claim 3, further comprising:
   making said computer accept an input for changing the optimization level appropriate to the evaluation period by said input device before said input device accepts said instruction; and
   making said computer change the correspondence between said evaluation period and said optimization level in response to said input when said input device accepts said input.

5. A software development tool program stored in a memory to generate an execution module based on object programs that are obtained by compiling one or many source program, comprising:
   making a computer, which connects with an input device and a recording device in which a series of source programs used to generate an execution module are stored, accept an instruction to execute compilations of said series of source programs by said input device;
   making the computer determine which of a first mode and a second mode is set when said input device accepts said instruction;
   making the computer determine an evaluation period to which an elapsed time from an update time of each of said series of source programs in said recording device belongs among many evaluation periods having different sizes, when said first mode is set;
   making the computer set an optimization option, for each of said series of source programs, whose level is appropriate to the evaluation period to which an elapsed time of a source program itself belongs;
   making the computer determine whether each of said series of source programs in said recording device includes information about an execution number of each of blocks dividing the source program in a predetermined size as profile information or not, when said second mode is set;
   making the computer calculate the total of the execution numbers of the respective blocks as an execution cost for each of said series of source programs only when said series of source programs include said profile information;
   making the computer calculate a ratio of the execution cost of said source program to the total of the execution costs of said series of source programs as an execution frequency of each of said source programs;
   making the computer determine an evaluation ratio range to which the calculated execution frequency of each of said source programs belongs among many evaluation ratio ranges having different sizes;

making the computer set an optimization option, for each of said series of source programs, whose level is appropriate to the evaluation ratio range to which an execution frequency of a source program itself belongs;

making the computer compile each of said source programs with the optimization level shown by said optimization option that is independently set in each of said series of source programs, in said first mode or said second mode; and making the computer record the respective object program obtained by said compilations into said recording device.

6. The software development tool program according to claim 5, further comprising:

making said computer accept an input for selecting said mode by said input device before said input device accepts said instruction; and making said computer set one of said first mode and said second mode in accordance with the selection.

7. A software development tool program stored in a memory to generate an execution module based on object programs that are obtained by compiling one or many source program, comprising:

making a computer, which connects with an input device and a recording device in which a series of source programs used to generate an execution module are stored, accept an instruction to execute compilations of said series of source programs by said input device;

making the computer determine an evaluation period to which an elapsed time from an update time of each of said series of source programs in said recording device belongs among many evaluation periods having different sizes, when said input device accepts said instruction;

making the computer determine whether said series of source programs include information about an execution number of each of blocks dividing the source program in a predetermined size as profile information or not;

making the computer calculate the total of the execution numbers of the respective blocks as an execution cost for each of said series of source programs only when said series of source programs include said profile information;

making the computer calculate a ratio of the execution cost of each of said source program to the total of the execution costs of said series of source programs as an execution frequency of each of said source programs;

making the computer determine an evaluation ratio range to which the calculated execution frequency of each of said source programs belongs among many evaluation ratio ranges having different sizes;

making the computer set an optimization option, for the source program whose execution frequency belongs to the maximum evaluation ratio range among the evaluation ratio ranges, whose level is appropriate to its evaluation ratio range, and set an optimization option, for the source program whose execution frequency does not belong to the maximum evaluation ratio range, whose level is appropriate to the evaluation period to which the elapsed time of the source program belongs;

making the computer compile each of said source programs with the optimization level shown by said optimization option that is independently set in each of said series of source programs; and making the computer record the respective object program obtained by said compilations into said recording device.

8. A software development tool program stored in a memory to generate an execution module based on object programs that are obtained by compiling one or many source program, comprising:

making a computer, which connects with an input device and a recording device in which a series of source programs used to generate an execution module are stored, accept an instruction to execute compilations of said series of source programs by said input device;

making the computer determine an evaluation period to which an elapsed time from an update time of each of said series of source programs in said recording device belongs among many evaluation periods having different sizes, when said input device accepts said instruction;

making the computer determine whether said series of source programs include information about an execution number of each of blocks dividing the source program in a predetermined size as profile information or not;

making the computer calculate the total of the execution numbers of the respective blocks as an execution cost for each of said series of source programs only when said series of source programs include said profile information;

making the computer calculate a ratio of the execution cost of each of said source program to the total of the execution costs of said series of source programs as an execution frequency of each of said source programs;

making the computer determine an evaluation ratio range to which the calculated execution frequency of each of said source programs belongs among many evaluation ratio ranges having different sizes;

making the computer set an optimization option, for the source program whose elapsed time belongs to the maximum evaluation period among the evaluation periods, whose level is appropriate to its evaluation period, and set an optimization option, for the source program whose elapsed time does not belong to the maximum evaluation period, whose level is appropriate to the evaluation ratio range to which said execution frequency of the source program belongs;

making the computer compile each of said source programs with the optimization level shown by said optimization option that is independently set in each of said series of source programs; and making the computer record the respective object program obtained by said compilations into said recording device.

9. The software development tool program according to one of claims 1 through 8, further comprising:

making said computer determine whether an addition of a debug option to a source program including a function that calls a function in said source programs is designated or not, when said input device accepts said instruction;

making said computer extract a source program, which includes a function that calls a function in said source programs, from said source programs before said source programs are compiled, when the addition of a debug option to a source program including a function that calls a function in said source programs is designated; and making said computer additionally set the debug option to an extracted source program.

10. The software development tool program according to claim 9, further comprising:

making said computer further extract a source program including a function that calls a function in the extracted source program, after extracting the source program including the function that calls the function in said source programs; and making said computer additionally set the debug options to the newly extracted source programs to which the debug options have not been set.

11. The software development tool program according to claim 10, further comprising:

making said computer additionally set debug options for all the source programs that have chain linkages with other source programs, wherein said chain linkage exists when a source program includes a function that calls a function in another source program.

12. The software development tool program according to one of claims 1 through 8, further comprising:

making said computer determine whether an addition of said optimization cancel option and a debug option is designated or not, before said input device accepts said instruction; and making said computer replace the optimization option with the optimization cancel option and additionally set the debug option for every source program before the compilations of said series of source programs, when the addition of said optimization cancel option and said debug option is designated.

* * * * *